(12) United States Patent
Lee et al.

(10) Patent No.: US 11,079,567 B2
(45) Date of Patent: Aug. 3, 2021

(54) LENS DRIVING DEVICE, CAMERA MODULE, AND OPTICAL DEVICE

(71) Applicant: LG INNOTEK CO., LTD., Seoul (KR)

(72) Inventors: Kap Jin Lee, Seoul (KR); Kyung Hwan Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 66 days.

(21) Appl. No.: 16/068,609

(22) PCT Filed: Jan. 11, 2017

(86) PCT No.: PCT/KR2017/000351
§ 371 (c)(1),
(2) Date: Jul. 6, 2018

(87) PCT Pub. No.: WO2017/122993
PCT Pub. Date: Jul. 20, 2017

(65) Prior Publication Data
US 2019/0041602 A1 Feb. 7, 2019

(30) Foreign Application Priority Data

Jan. 11, 2016 (KR) .................. 10-2016-0003029
Mar. 25, 2016 (KR) .................. 10-2016-0035742

(51) Int. Cl.
*G02B 7/09* (2021.01)
*G02B 7/02* (2021.01)
(Continued)

(52) U.S. Cl.
CPC .................. *G02B 7/09* (2013.01); *G01J 3/28* (2013.01); *G02B 5/28* (2013.01); *G02B 7/02* (2013.01);
(Continued)

(58) Field of Classification Search
CPC ... G02B 7/09; G02B 5/28; G02B 7/02; H02K 11/20; H02K 11/00; H02K 33/16; G01J 3/28; G03B 3/10; G03B 13/36
(Continued)

(56) References Cited

U.S. PATENT DOCUMENTS

| 8,379,337 B2 | 2/2013 | Wade et al. |
| 9,857,555 B2 | 1/2018 | Lee et al. |

(Continued)

FOREIGN PATENT DOCUMENTS

| CN | 2420657 Y | 2/2001 |
| CN | 101246246 A | 8/2008 |

(Continued)

OTHER PUBLICATIONS

Office Action dated Jul. 30, 2019 in European Application No. 17738622.4.
(Continued)

*Primary Examiner* — James R Greece
(74) *Attorney, Agent, or Firm* — Saliwanchik, Lloyd & Eisenschenk

(57) ABSTRACT

The present embodiment relates to a lens driving device comprising: a housing; a bobbin disposed inside the housing; a coil disposed at the bobbin; a magnet disposed in the housing and facing the coil; an elastic member coupled to the housing and the bobbin; and a damper disposed at the elastic member, wherein the elastic member comprises an outer part coupled to the housing, an inner part coupled to the bobbin, and a connection part for connecting the outer part and the inner part; and the damper is disposed at the connection part.

19 Claims, 8 Drawing Sheets

(51) Int. Cl.
| | |
|---|---|
| *H02K 33/16* | (2006.01) |
| *G03B 3/10* | (2021.01) |
| *H02K 11/00* | (2016.01) |
| *G02B 5/28* | (2006.01) |
| *G01J 3/28* | (2006.01) |
| *G03B 13/36* | (2021.01) |
| *H02K 11/20* | (2016.01) |
| *G02B 27/64* | (2006.01) |
| *G03B 5/00* | (2021.01) |

(52) U.S. Cl.
CPC .............. *G03B 3/10* (2013.01); *G03B 13/36* (2013.01); *H02K 11/00* (2013.01); *H02K 11/20* (2016.01); *H02K 33/16* (2013.01); *G02B 27/646* (2013.01); *G03B 5/00* (2013.01); *G03B 2205/0069* (2013.01); *G03B 2217/002* (2013.01)

(58) Field of Classification Search
USPC .................................................. 359/811, 823
See application file for complete search history.

(56) References Cited

U.S. PATENT DOCUMENTS

| | | | |
|---|---|---|---|
| 2010/0328791 A1* | 12/2010 | Jung | .................... G03B 17/02 359/824 |
| 2011/0176046 A1 | 7/2011 | Hu et al. | |
| 2012/0120512 A1 | 5/2012 | Wade et al. | |
| 2013/0050828 A1 | 2/2013 | Sato et al. | |
| 2013/0215511 A1 | 8/2013 | Wu et al. | |
| 2015/0207983 A1 | 7/2015 | Kang et al. | |

FOREIGN PATENT DOCUMENTS

| | | | |
|---|---|---|---|
| CN | 101887158 | A | 11/2010 |
| CN | 102062926 | A | 5/2011 |
| CN | 102135656 | A | 7/2011 |
| CN | 104902149 | A | 9/2015 |
| CN | 104937482 | A | 9/2015 |
| JP | 03168935 | A * | 7/1991 |
| JP | 2009-271204 | A | 11/2009 |
| JP | 2013-167867 | A | 8/2013 |
| KR | 10-2015-0089648 | A | 8/2015 |
| KR | 10-2016-0000728 | A | 1/2016 |
| WO | WO-2009/096664 | A1 | 8/2009 |

OTHER PUBLICATIONS

International Search Report in International Application No. PCT/KR2017/000351, filed Jan. 11, 2017.

Office Action dated Jun. 2, 2020 in Chinese Application No. 201780006384.X.

* cited by examiner

LENS DRIVING DEVICE, CAMERA MODULE, AND OPTICAL DEVICE

CROSS-REFERENCE TO RELATED APPLICATIONS

This application is the U.S. national stage application of International Patent Application No. PCT/KR2017/000351, filed Jan. 11, 2017, which claims priority to Korean Application Nos. 10-2016-0003029, filed Jan. 11, 2016; and 10-2016-0035742, filed Mar. 25, 2016, the disclosures of each of which are incorporated herein by reference in their entirety.

TECHNICAL FIELD

The teachings in accordance with exemplary and non-limiting embodiments of this invention relate generally to a lens driving device, a camera module, and an optical device.

BACKGROUND ART

This section provides background information related to the present invention, which is not necessarily prior art.

Concomitant with widely-generalized dissemination of various mobile terminals and commercialization of wireless Internet services, demands on mobile terminals by consumers are diversified to thereby prompt various types of circumferential devices or additional equipment to be mounted on mobile terminals.

Inter alia, camera modules may be representative items that photograph an object in a still picture or a video. Recently, camera modules equipped with an AF (Auto Focus) function have been developed.

On the other hand, conventional camera modules have suffered from difficulties in controlling lens using an accurate focal length due to lack of function to detect a position of the lens. Thus, although camera modules having auto focus feedback function have been developed, there are still generated a problem where an elastic member resonates when a shock is applied that corresponds to a resonant frequency of the elastic member that couples a bobbin and a housing, if the conventional camera module is added with the auto focus feedback function.

DETAILED DESCRIPTION OF THE INVENTION

Technical Subject

In order to solve the abovementioned problems, exemplary embodiments of the present invention provide a lens driving device configured to perform a feedback control of auto focus by detecting a position of lens. Furthermore, exemplary embodiments of the present invention provide an easy structure design-wise in adjusting a damping force in a closed-loop type lens driving device. Still furthermore, exemplary embodiments of the present invention provide a camera module including the lens driving device and an optical device.

Technical Solution

In one general aspect of the present invention, there is provided a lens driving device comprising: a housing; a bobbin disposed inside the housing; a coil disposed at the bobbin; a magnet disposed in the housing and facing the coil; an elastic member coupled to the housing and the bobbin; and a damper disposed at the elastic member, wherein the elastic member comprises an outer part coupled to the housing, an inner part coupled to the bobbin, and a connection part for connecting the outer part and the inner part; and the damper is disposed at the connection part.

Preferably, but not necessarily, the elastic member may include an upper elastic member disposed at an upper side of the bobbin and coupled to the bobbin and the housing, and a lower elastic member disposed at a lower side of the bobbin and coupled to the bobbin and the housing, and the damper may be disposed at the lower elastic member.

Preferably, but not necessarily, the damper may include a first damper integrally coated on the connection part and the inner part.

Preferably, but not necessarily, the connection part may include an outer extension part extended from the outer part, an inner extension part extended from the inner part and a connecting extension part connecting the outer extension part and the inner extension part, wherein the connecting extension part may include a first extension part and a second extension part slantly extended from the first extension part, wherein the inner part may include a first and second coupling parts coupled to the bobbin and spaced apart from each other, a body part connecting the first and second coupling parts, and a protrusion part outwardly extended from the body part and at least a portion thereof being disposed between the first extension part and the second extension part, wherein the damper may be integrally coated on the connecting extension part and the protrusion part.

Preferably, but not necessarily, the connecting extension part may include a third extension part slantly extended from the second extension part, and a fourth extension part slantly extended from the third extension part, wherein the first to fourth extension parts are roundly formed at least on a partial portion thereof.

Preferably, but not necessarily, the first damper may be coated on any one of a first position integrally coated on the first extension part and the protrusion part, and a second position integrally coated on the second extension part and the protrusion part.

Preferably, but not necessarily, the first damper may be coated on any one of a third position integrally coated on the outer extension part and the body part, a fourth position integrally coated on the inner extension part and the protrusion part, and a fifth position integrally coated on the connecting extension part and the body part.

Preferably, but not necessarily, the damper may include a second damper integrally coated on the connection part and the outer part.

Preferably, but not necessarily, the second damper may be coated on a plurality of positions, each position being mutually spaced apart.

Preferably, but not necessarily, the connection part may include an outer extension part extended from the outer part, an inner extension part extended from the inner part and a connecting extension part connecting the outer extension part and the inner extension part, wherein the connecting extension part may include a first extension part and a second extension part slantly extended from the first extension part, and wherein the damper may include a third damper integrally coated on the first extension part and the second extension part.

Preferably, but not necessarily, the lens driving device may further comprise: a sensing magnet disposed at one side of the bobbin; and a sensor disposed at the housing and facing the sensing magnet, wherein the sensor may be disposed at a corner part of the housing.

Preferably, but not necessarily, the magnet may be disposed at a lateral part of the housing, and the magnet may be lopsidedly disposed to one side of the corner part out of two sides of the corner part of the housing.

Preferably, but not necessarily, the lens driving device may further comprise a compensating magnet disposed at the other side of the bobbin and having a shape and a magnetism corresponding to those of the sensing magnet.

Preferably, but not necessarily, the lens driving device may further comprise: a substrate disposed with the sensor; and a substrate reception part formed by allowing an outer lateral surface of the housing to be recessed and accommodated by at least a portion of the substrate.

Preferably, but not necessarily, the substrate may include a body part accommodated into the substrate reception part, a terminal part extended downwardly from the body part and an extension part bent from the body part to be extended inward of the corner part of the housing and mounted with the sensor, wherein the body part is not horizontally overlapped with the magnet.

Preferably, but not necessarily, the housing may include a first lateral part and a third lateral part, each formed at an opposite side, a second lateral part and a fourth lateral part formed between the first lateral part and the third lateral part, each formed at an opposite side, and a first to fourth corner parts interposed between the first to fourth lateral parts, wherein the magnet may include a first magnet unit disposed at the first lateral part, a second magnet unit disposed at the second lateral part, a third magnet unit disposed at the third lateral part and a fourth magnet unit disposed at the fourth lateral unit, wherein the sensor may be disposed at the first corner part, a center of the first magnet unit is disposed closer to the fourth corner part than the first corner part, a center of the second magnet unit is disposed closer than to the second corner part than the first corner part, a center of the third magnet unit is disposed closer to the second corner part than the third corner part and a center of the fourth magnet unit is disposed closer to the fourth corner part than the third corner part.

Preferably, but not necessarily, the lower elastic member may include a first lower elastic unit electrically connected to a distal end of one side of the coil and a second lower elastic unit spaced apart from the first lower elastic unit and electrically connected to the other distal end of the coil.

Preferably, but not necessarily, the lens driving device may further comprise a substrate mounted with the sensor, wherein the first and second lower elastic units are electrically connected to the substrate.

In still general aspect of the present invention, there is provided a camera module, comprising: a PCB (Printed Circuit Board); an image sensor disposed at the PCB; a base disposed at an upper side of the PCB; a housing disposed at an upper side of the base; a bobbin disposed at an inside of the housing; a coil disposed at the bobbin; a magnet disposed at the housing and facing the coil; an elastic member coupled to the housing and the bobbin; and a damper disposed at the elastic member, wherein the elastic member includes an outer part coupled to the housing, an inner part coupled to the bobbin and a connection part connecting the outer part and the inner part, and wherein the damper is disposed at the connection part.

In still further general aspect of the present invention, there is provided an optical device including a main body, a camera module disposed at the main body to photograph an image of a subject, and a display part disposed at the main body to output the image photographed by the camera module, the optical device comprising: a PCB (Printed Circuit Board); an image sensor disposed at the PCB; a base disposed at an upper side of the PCB; a housing disposed at an upper side of the base; a bobbin disposed at an inside of the housing; a coil disposed at the bobbin; a magnet disposed at the housing and facing the coil; an elastic member coupled to the housing and the bobbin; and a damper disposed at the elastic member, wherein the elastic member includes an outer part coupled to the housing, an inner part coupled to the bobbin and a connection part connecting the outer part and the inner part, and wherein the damper is disposed at the connection part.

A lens driving device according to an exemplary embodiment may comprise: a housing; a bobbin disposed at an inside of the housing; a first driving part disposed at the bobbin; a second driving part disposed at the housing and facing the first driving part; an elastic member coupled to the housing and the bobbin; and a damper coated on the elastic member, wherein the elastic member may include an outer part coupled to the housing, an inner part coupled to the bobbin, and a connection part connecting the outer part and the inner part, and wherein the damper may be disposed at the connection part.

Preferably, but not necessarily, the damper may include a first damper integrally coated on the connection part and the inner part.

Preferably, but not necessarily, the connection part may include an outer extension part extended from the outer part, an inner extension part extended from the inner part and a connection extension part connecting the outer extension part and the inner extension part, wherein the connection extension part may include a first extension part, and a second extension part slantly extended from the first extension part, and wherein the inner part may include first and second coupling parts coupled to the bobbin, each spaced apart from the other, a body part connecting the first and second coupling parts, and a protrusion part extended from the body part and at least one portion being disposed at the connection extension part.

Preferably, but not necessarily, the connection extension part may further include a third extension part slantly extended from the second extension part, and a fourth extension part slantly extended from the third extension part, wherein the first to fourth extension parts may be roundly formed at least on a partial portion thereof.

Preferably, but not necessarily, the first damper may be coated on any one of a first position integrally coated on the first extension part and the protrusion part, and a second position integrally coated on the second extension part and the protrusion part.

Preferably, but not necessarily, the first damper may be coated on any one of a third position integrally coated on the outer extension part and the body part, a fourth position integrally coated on the inner extension part and the protrusion part, and a fifth position integrally coated on the connecting extension part and the body part.

Preferably, but not necessarily, the damper may include a second damper integrally coated on the connection part and the outer part.

Preferably, but not necessarily, the second damper may be coated on a plurality of positions, each position being mutually spaced apart.

Preferably, but not necessarily, the connection part may include an outer extension part extended from the outer part, an inner extension part extended from the inner part and a connecting extension part connecting the outer extension part and the inner extension part, wherein the connecting extension part may include a first extension part and a second extension part slantly extended from the first extension part, and wherein the damper may include a third damper integrally coated on the first extension part and the second extension part.

Preferably, but not necessarily, the lens driving device may further comprise: a sensing magnet disposed at one side of the bobbin; and a compensating magnet disposed at the other side of the bobbin; and a sensor part disposed at the housing to detect the sensing magnet.

Preferably, but not necessarily, the elastic member may include an upper elastic member coupled to an upper surface of housing and to an upper surface of bobbin, and a lower elastic member coupled to a lower surface of housing and to a lower surface of bobbin, wherein the damper may be disposed at the lower elastic member.

Preferably, but not necessarily, a camera module according to an exemplary embodiment of the present invention may comprise: a housing; a bobbin disposed at an inside of the housing; a first driving part disposed at the bobbin; a second driving part disposed at the housing and facing the first driving part; an elastic member coupled to the housing and the bobbin; and a damper coated on the elastic member, wherein the elastic member may include an outer part coupled to the housing, an inner part coupled to the bobbin, and a connection part connecting the outer part and the inner part, and wherein the damper may be disposed at the connection part.

Preferably, but not necessarily, an optical device according to an exemplary embodiment of the present invention may comprise: a housing; a bobbin disposed at an inside of the housing; a first driving part disposed at the bobbin; a second driving part disposed at the housing and facing the first driving part; an elastic member coupled to the housing and the bobbin; and a damper coated on the elastic member, wherein the elastic member may include an outer part coupled to the housing, an inner part coupled to the bobbin, and a connection part connecting the outer part and the inner part, and wherein the damper may be disposed at the connection part.

Preferably, but not necessarily, a lens driving device according to an exemplary embodiment may comprise: a housing including a first lateral surface, a second lateral surface adjacent to the first lateral surface, and a first corner part interposed between the first lateral surface and the second lateral surface; a first driving part disposed at the housing; a bobbin disposed at an inside of the housing; a second driving part disposed at the bobbin and facing the first driving part; an elastic member movably supporting the bobbin relative to the housing; a sensing magnet disposed at the bobbin; and a sensor part detecting the sensing magnet; wherein the sensing magnet may be disposed to face the first corner part.

Preferably, but not necessarily, the housing may include a third lateral surface adjacent to the second lateral surface, a fourth lateral surface adjacent to the third lateral surface and the first lateral surface, and a second corner part interposed between the third lateral surface and the fourth lateral surface, wherein the sensing magnet may be disposed on any one of the first corner part and the second corner part.

Preferably, but not necessarily, the lens driving device may further comprise a compensating magnet having a shape and a magnetism corresponding to those of the sensing magnet, wherein the compensating magnet may be disposed on any one of the first corner part and the second corner part where the sensing magnet is not disposed.

Preferably, but not necessarily, the lens driving device may further comprise: a substrate mounted with the sensor part; and a substrate reception part formed by being inwardly recessed to the first lateral surface or the second lateral surface to accommodate at least one portion of the substrate.

Preferably, but not necessarily, the substrate may include a body part accommodated into the substrate reception part, a terminal part extended downwardly from the body part and an extension part bent from the body part to be extended to a first corner part side, and mounted with the sensor part, wherein the body part may not be horizontally overlapped with the first driving part and wherein the extension part may be inwardly bent from the body part.

Preferably, but not necessarily, the second driving part may include a coil part, and the sensing magnet may be horizontally overlapped with the coil part and may be disposed at an inside of the coil part.

Preferably, but not necessarily, the first driving part may include a magnet, and the second driving part may include a coil part, and the magnet may include a first magnet unit disposed at the first lateral surface, a second magnet unit disposed at the second lateral surface, a third magnet unit disposed at the third lateral surface and a fourth magnet unit disposed at the fourth lateral surface.

Preferably, but not necessarily, the housing may further include a third corner part interposed between the first lateral surface and the fourth lateral surface, wherein a center of the first magnet may disposed closer to the third corner part than to the first corner part.

Preferably, but not necessarily, the second driving part may include a coil part, and the elastic member may include a lower elastic member coupled to a lower surface of the bobbin and to a lower surface of the housing to elastically support the bobbin relative to the hosing, and the lower elastic member may include a first lower support unit electrically connecting a distal end at one side of the coil part and the substrate, and a second lower support unit spaced apart from the first lower support unit to electrically connect a distal end at the other side of the coil part and the substrate.

Preferably, but not necessarily, a camera module according to an exemplary embodiment of the present invention may comprise: a housing including a first lateral surface, a second lateral surface adjacent to the first lateral surface, and a first corner part interposed between the first lateral surface and the second lateral surface; a first driving part disposed at the housing; a bobbin disposed at an inside of the housing; a second driving part disposed at the bobbin and facing the first driving part; an elastic member movably supporting the bobbin relative to the housing; a sensing magnet disposed at the bobbin; and a sensor part detecting the sensing magnet; wherein the sensing magnet may be disposed to face the first corner part.

Preferably, but not necessarily, an optical device according to an exemplary embodiment of the present invention may comprise: a housing including a first lateral surface, a second lateral surface adjacent to the first lateral surface, and a first corner part interposed between the first lateral surface and the second lateral surface; a first driving part disposed at the housing; a bobbin disposed at an inside of the housing; a second driving part disposed at the bobbin and facing the first driving part; an elastic member movably supporting the bobbin relative to the housing; a sensing magnet disposed at the bobbin; and a sensor part detecting the sensing magnet; wherein the sensing magnet may be disposed to face the first corner part.

Advantageous Effects

Through the present invention, a damping force can be easily adjusted design-wise. To be more specific, a damping gel coating position can be set design-wise according to a necessary damping force.

Through the exemplary embodiments, a position of a lens can be detected in a state where a tilt caused by influence of magnetic field interference between a sensing magnet and a driving magnet is minimized.

Furthermore, in the present exemplary embodiments, a sensing magnet and a sensor part are disposed at a corner part to allow a driving magnet to be disposed at all four lateral surfaces of housing, whereby it is advantageous to obtain an electromagnetic force for auto focus function.

Still furthermore, a lens position detection function can be realized without recourse to an increase in an outer size of a lens driving device.

Moreover, a damper can be coated just before a final assembly of base to provide a structure where cleaning by chemical solution can be possible before a damper coating which is a final assembly stage.

BEST MODE

Figure 1:
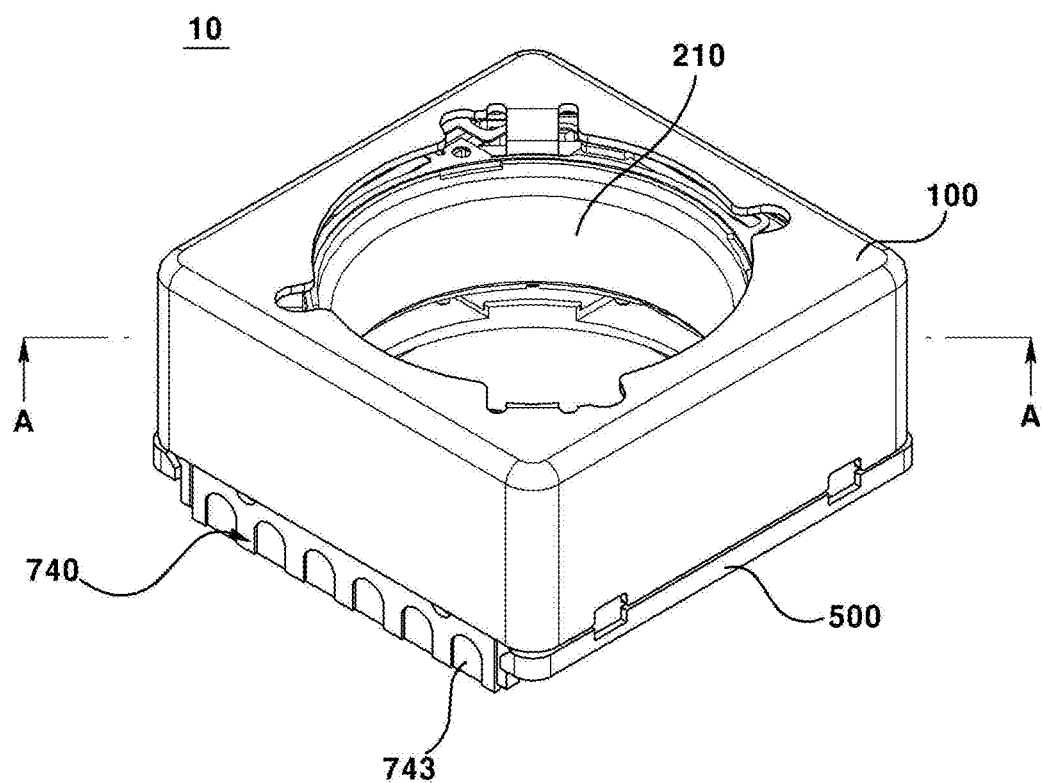
FIG. 1 is a perspective view illustrating a lens driving device according to an exemplary embodiment of the present invention.

Some of the exemplary embodiments of the present invention will be described with the accompanying drawings. Throughout the descriptions, the same reference numerals will be assigned to the same elements in the explanations of the figures.

Furthermore, the terms "first," "second," "A", "B", (a), (b) and the like may be used in the explanation of elements in the exemplary embodiment of the present invention.

These terms herein do not denote any nature, sequence or order, but rather are used to distinguish one element from another. It should be appreciated that when one element is 'connected', 'coupled' or 'joined' to other elements, the element may be directly connected, coupled or joined to other elements, and still other elements may be connected, coupled or joined between the one element and the other elements.

An "optical axis direction" as used hereinafter may be defined as an optical axis direction of a lens module in a state of being coupled to a lens driving device. Meantime, the "optical axis direction" may be interchangeably used with "vertical direction" and "z axis direction" and the like.

An "auto focus function" as used hereinafter may be defined as a function of automatically matching a focus relative to an object by adjusting a distance from an image sensor by moving a lens module to an optical axis direction. Meantime, the "auto focus" may be interchangeably used with "AF".

A "handshake correction function" as used hereinafter may be defined as a function of moving or tilting a lens module to a direction perpendicular to an optical axis direction in order to offset vibration (movement) generated on the image sensor by an outer force. Meantime, the "handshake correction" may be interchangeably used with an "OIS (Optical Image Stabilization)".

As used hereinafter, any one of a driving coil (220) and a driving magnet (320) may be called a 'first driving part' and the remaining one may be called a 'second driving part'.

As used hereinafter, any one of a driving magnet (320), a sensing magnet (710) and a compensating magnet (720) may be called a 'first magnet', and other remaining one may be called a 'second magnet', or a 'third magnet'.

Now, a configuration of an optical device according to an exemplary embodiment of the present invention will be described hereinafter.

The optical device may be any one of a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical device may include a main body (not shown), a camera module and a display part (not shown). However, any one or more of the main body, the camera module and the display part may be omitted or changed.

The main body may form an exterior look of an optical device. For example, the main body may include a look of a cubic shape. For another example, the main body may be formed in a round shape on at least some portions thereof. The main body may accommodate a camera module. The main body may be arranged at one surface with a display part. For example, the display part and the camera module may be disposed at one surface of the main body and a camera module may be additionally disposed at the other surface (surface opposite to the one surface) of main body.

The camera module may be disposed at the main body. The camera module may be disposed at one surface of the main body. At least some portions of the camera module may be accommodated into the main body. The camera module may be formed in a plural number. The plurality of camera modules may be respectively disposed at one surface of the main body and the other surface of the main body. The camera module may photograph an image of a subject.

The display part may be disposed at the main body. The display part may be disposed at one surface of main body. That is, the display part may be arranged on a same surface as that of the camera module. Alternatively, the display part may be disposed at the other surface of main body. The display part may be disposed at a surface on the main body opposite to a surface arranged with the camera module. The display part may output an image photographed by the camera module.

Now, configuration of camera module according to an exemplary embodiment of the present invention will be described.

The camera module may include a lens driving device (10), a lens module (not shown), an infrared cut-off filter (not shown), a PCB (Printed Circuit Board, not shown), an image sensor (not shown), and a controller (not shown). However, any one or more of the lens driving device, the lens module, the infrared cut-off filter, the PCB, the image sensor, and the controller may be omitted or changed from the camera module.

The lens module may include at least one lens. The lens module may include a lens and a lens barrel. The lens module may include one or more lenses (not shown) and a lens barrel accommodating the lenses. However, one element of the lens module is not limited by the lens barrel, and any holder structure capable of supporting one or more lenses will suffice. The lens module may be coupled to an inside of the lens driving device (10). The lens module may be coupled to a bobbin (210) of lens driving device (10). The lens module may move integrally with the bobbin (210). The lens module may be coupled to the bobbin (210) using an adhesive (not shown). The lens module may be screw-coupled with the bobbin (210), for example. Meantime, a light having passed the lens module may be irradiated on an image sensor.

The infrared cut-off filter may serve to inhibit a light of infrared ray region from entering an image sensor. The infrared cut-off filter may be interposed between a lens module and an image sensor. For example, the infrared cut-off filter may be disposed at a holder member (not shown) separately formed independent from a base (500). For another example, the infrared cut-off filter may be installed at a through hole (510) of a base (500). The infrared cut-off filter may be formed with a film material or a glass material. The infrared cut-off filter may be formed by allowing an infrared cut-off coating material to be coated on a plate-shaped optical filter such as an imaging plane protection cover glass or a cover glass. For example, the infrared cut-off filter may be an infrared absorption filter (blue filter) absorbing an infrared ray. For another example, the infrared cut-off filter may be an infrared reflection filter reflecting an infrared ray.

The lens driving device (10) may be disposed at an upper surface of a PCB. The PCB may be disposed at a lower (bottom) surface of the lens driving device. The PCB may be coupled with the lens driving device (10). The PCB may be mounted with an image sensor. The PCB may be electrically connected to the image sensor. A holder member may be interposed between the PCB and the lens driving device (10), for example. At this time, the image sensor may be accommodated at an inside of the holder member. In another example, the lens driving device (10) may be directly disposed at the PCB. At this time, the image sensor may be accommodated at an inside of the lens driving device (10). Through this configuration, a light having passed the lens module coupled to the lens driving device (10) may be irradiated on the image sensor disposed at the PCB. The PCB may supply a power (current) to the lens driving device (10). Meantime, the PCB may be disposed with a controller in order to control the lens driving device (10).

The image sensor may be mounted on the PCB. The image sensor may be electrically connected to the PCB. For example, the image sensor may be coupled to the PCB using an SMT (Surface Mounting Technology). In another example, the image sensor may be coupled to the PCB using a flip chip technology. An optical axis of the image sensor may be so disposed as to match that of the lens module. That is, an optical axis of image sensor and an optical axis of lens module may be aligned, through which the image sensor can obtain a light having passed the lens module. The image sensor may convert the light irradiated to an effective image area of image sensor to an electrical signal. The image sensor may be any one of a CCD (charge coupled device), an MOS (metal oxide semi-conductor), a CPD and a CID, for example. However, the types of image sensor are not limited thereto, and any configuration capable of converting an incident light to an electrical signal may be permitted.

The controller may be mounted on a PCB. The controller may individually control a direction, intensity and an amplitude of a current supplied to each element forming the lens driving device (10). The controller may perform an AF function of camera module by controlling the lens driving device (10). That is, the controller may move the lens module to an optical axis direction to an optical axis direction by controlling the lens driving device (10). Furthermore, the controller may perform a feedback control of AF function. To be more specific, the controller may provide a more accurate auto focus function by controlling a current or a power supplied to a driving coil (220) by receiving a position of lens module detected by a sensing unit (700).

Hereinafter, configuration of lens driving device will be described in detail according to an exemplary embodiment of the present invention with reference to the accompanying drawings.

Figure 2:
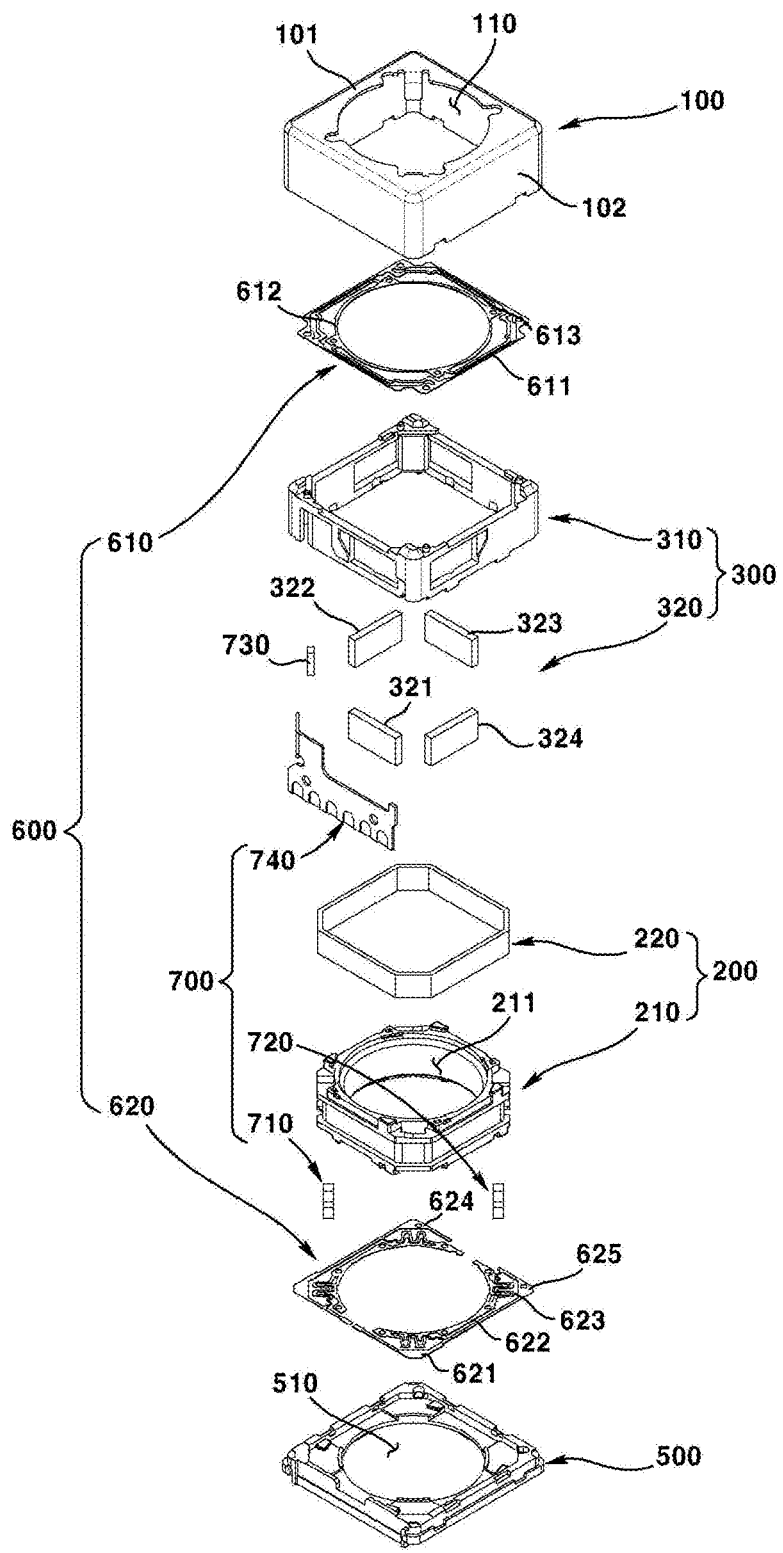
FIG. 2 is an exploded perspective view illustrating a lens driving device according to an embodiment of the present invention.
Figure 3:
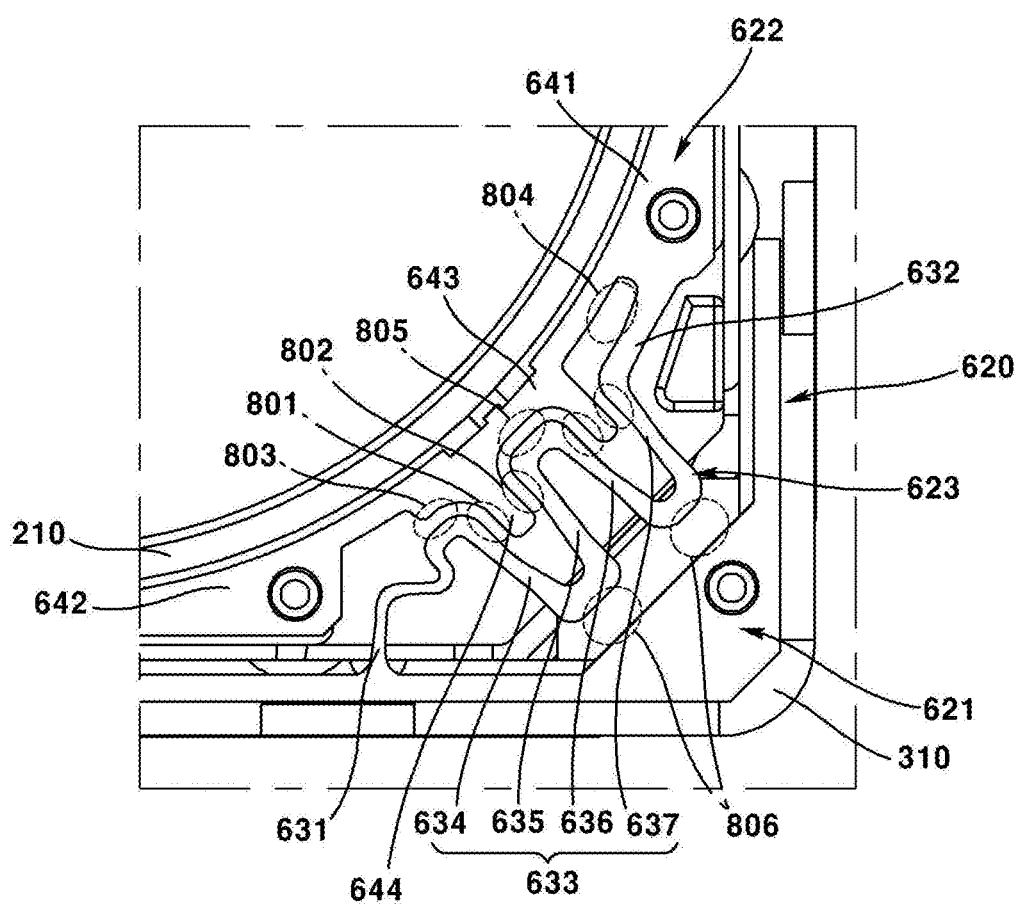
FIG. 3 is a lower view illustrating some elements of a lens driving device according to an exemplary embodiment of the present invention.
Figure 4:
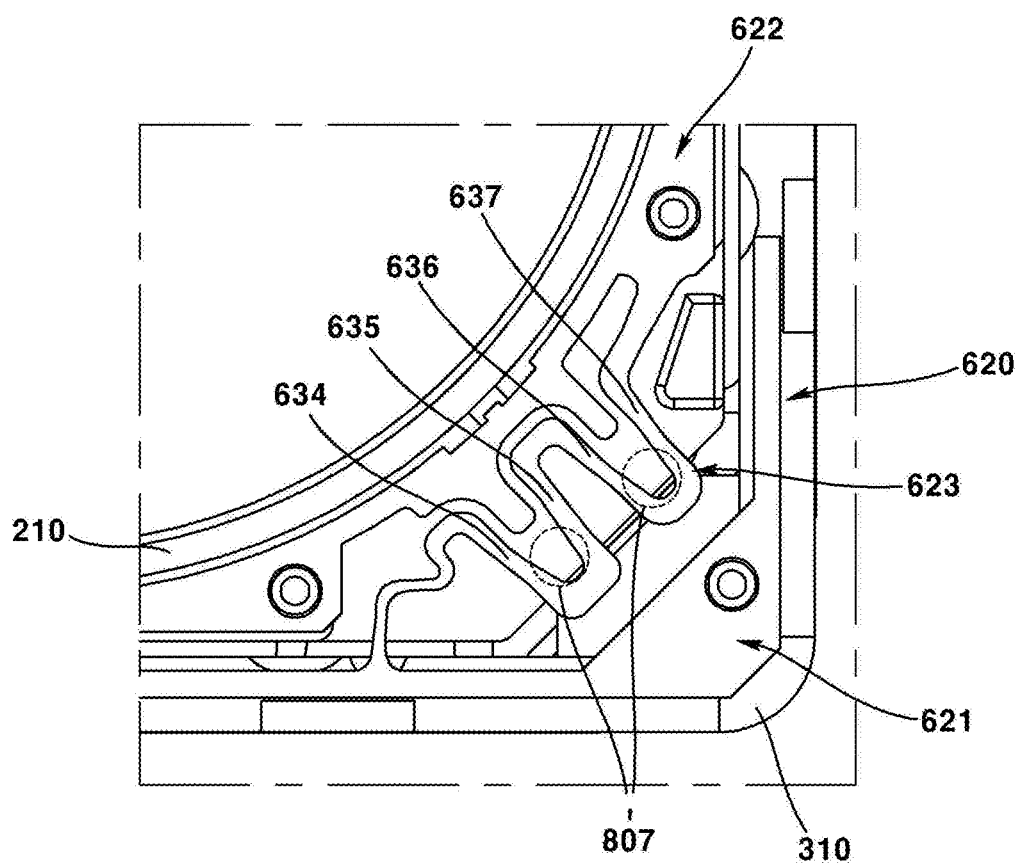
FIG. 4 is a lower view illustrating some elements of a lens driving device according to a modification of the present invention.
Figure 5:
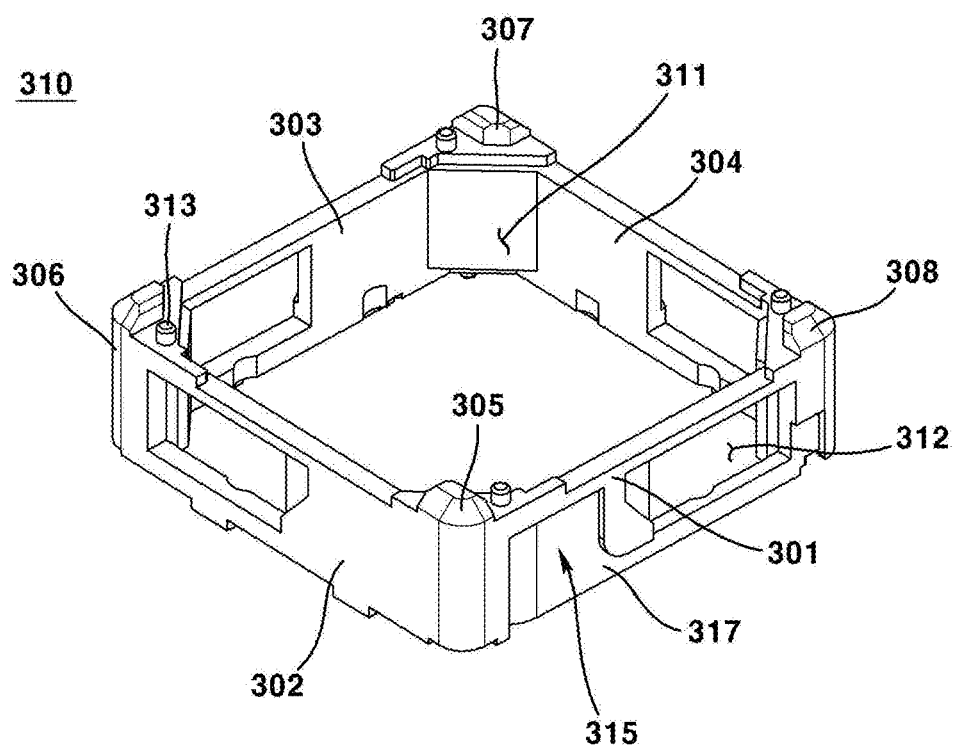
FIG. 5 is a perspective view illustrating a housing of a lens driving device according to an exemplary embodiment of the present invention.
Figure 6:
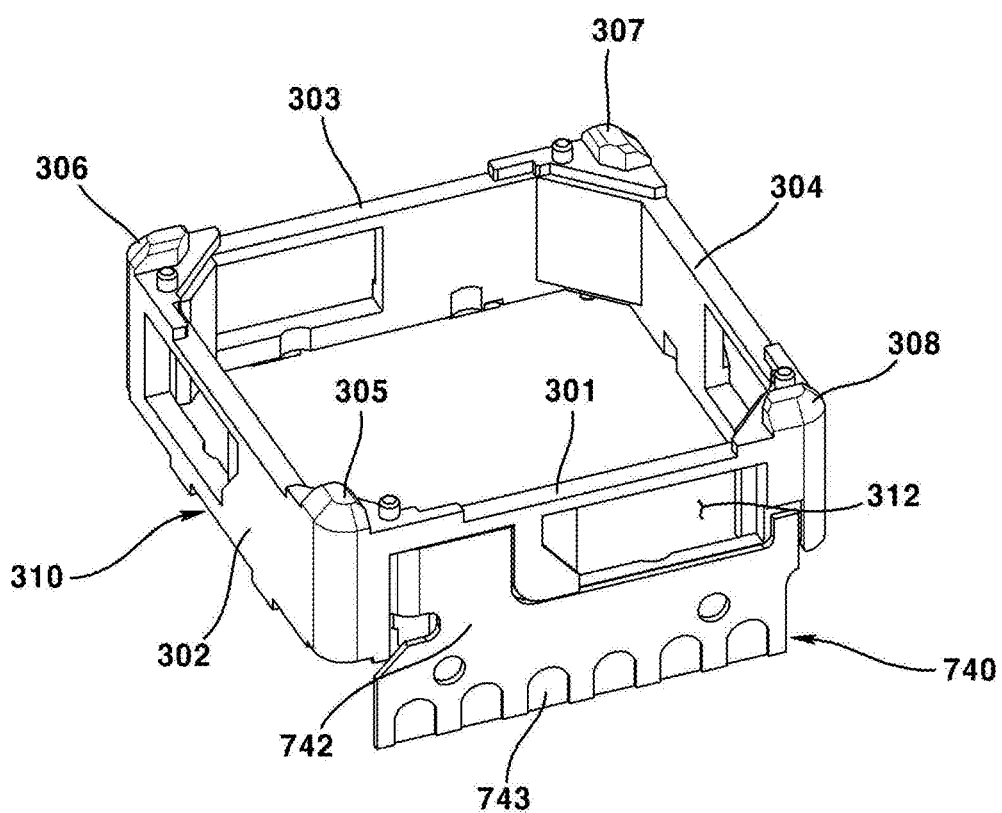
FIG. 6 is a perspective view illustrating some elements of a lens driving device according to an exemplary embodiment of the present invention.
Figure 7:
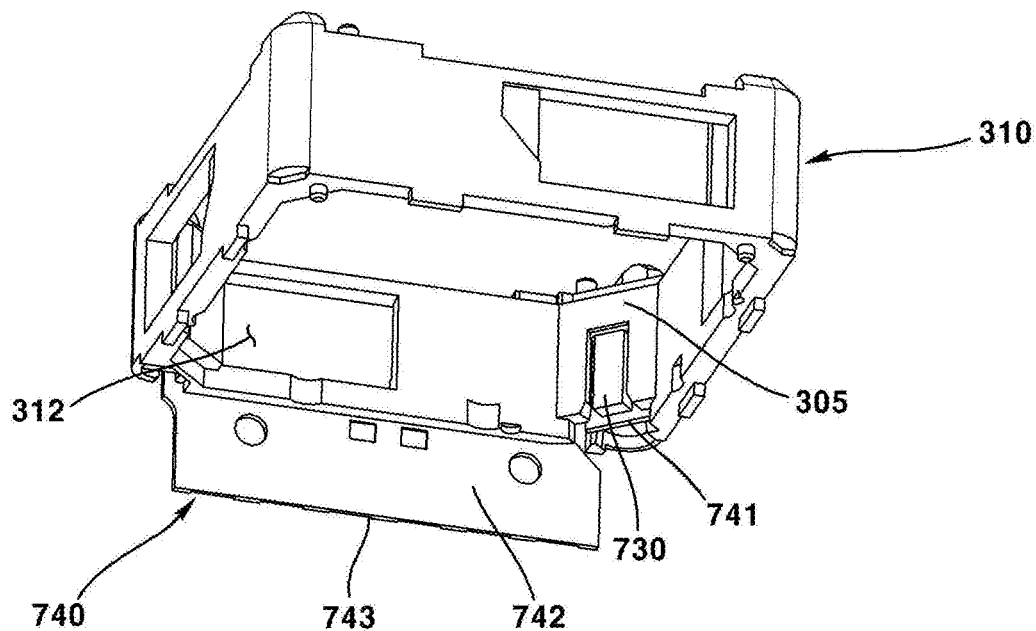
FIG. 7 is a lower perspective view illustrating some elements of a lens driving device according to an exemplary embodiment of the present invention.
Figure 8:
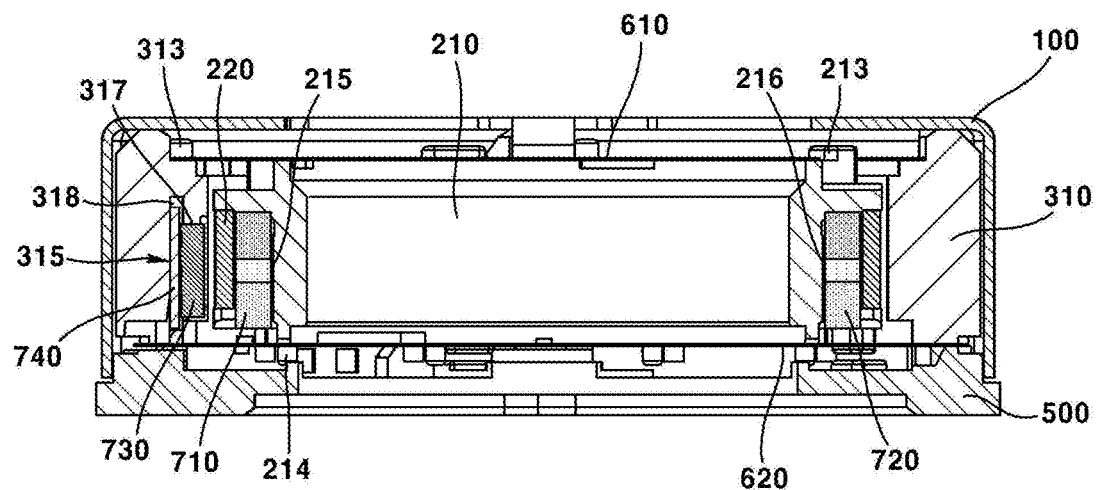
FIG. 8 is a cross-sectional view taken along line A-A of FIG. 1.
Figure 9:
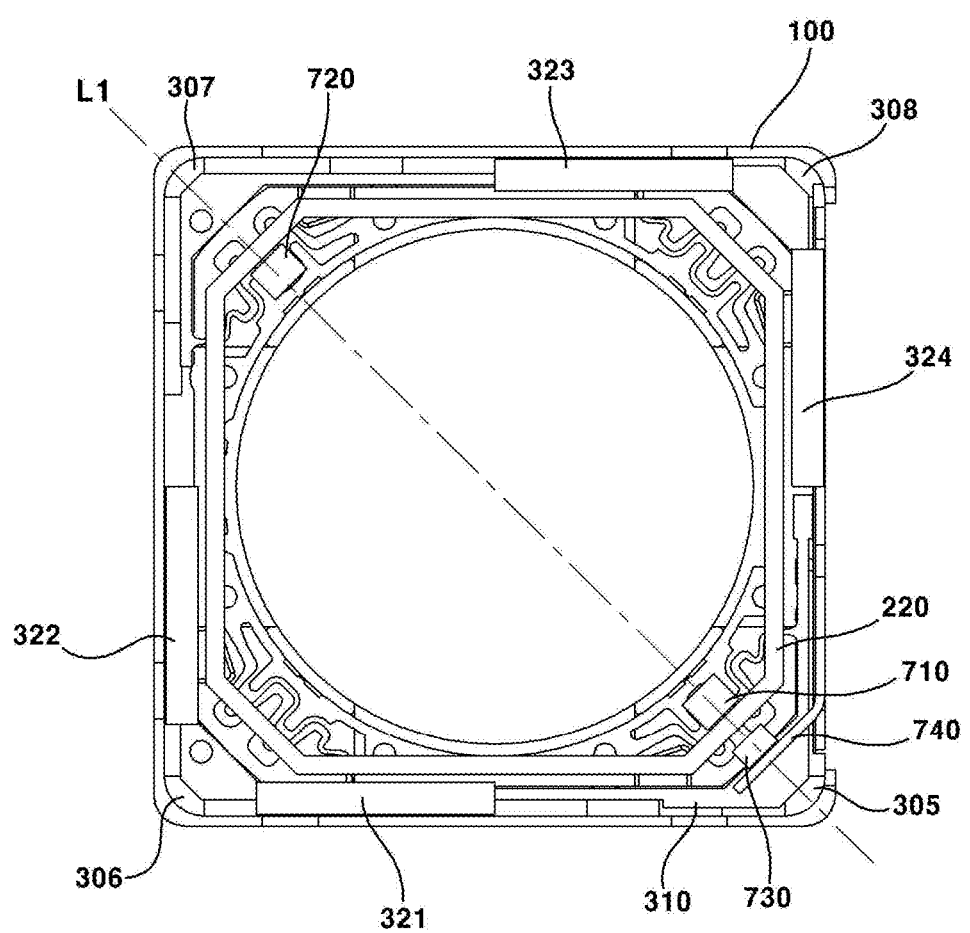
FIG. 9 is a plane view illustrating some elements of a lens driving device according to an exemplary embodiment of the present invention.

FIG. 1 is a perspective view illustrating a lens driving device according to an exemplary embodiment of the present invention, FIG. 2 is an exploded perspective view illustrating a lens driving device according to an embodiment of the present invention, FIG. 3 is a lower view illustrating some elements of a lens driving device according to an exemplary embodiment of the present invention, FIG. 4 is a lower view illustrating some elements of a lens driving device according to a modification of the present invention, FIG. 5 is a perspective view illustrating a housing of a lens driving device according to an exemplary embodiment of the present invention, FIG. 6 is a perspective view illustrating some elements of a lens driving device according to an exemplary embodiment of the present invention, FIG. 7 is a lower perspective view illustrating some elements of a lens driving device according to an exemplary embodiment of the present invention, FIG. 8 is a cross-sectional view taken along line A-A of FIG. 1, and FIG. 9 is a plane view illustrating some elements of a lens driving device according to an exemplary embodiment of the present invention.

The lens driving device (10) may include a cover member (100), a mover (200), a stator (300), a base (500), an elastic member (600) and a sensing unit (700). However, the lens driving device (10) according to the exemplary embodiment of the present invention may omit of change any one of the cover member (100), the mover (200), the stator (300), the base (500), the elastic member (600) and the sensing unit (700). Inter alia, the sensing unit (700) may be omitted because the sensing unit (700) is an element for AF feedback function.

The cover member (100) may form an exterior look of lens driving device (10). The cover member (100) may take a bottom-opened cubic shape. However, the shape of the cover member (100) is not limited thereto. The cover member (100) may be formed with a non-magnetic substance. If the cover member (100) is formed with a magnetic substance, a magnetic force of cover member (100) may be influenced to any one or more of a driving magnet (320), a sensing magnet (710) and a compensating magnet (720). The cover member (100) may be formed with a metal material. To be more specific, the cover member (100) may be formed with a metal plate. In this case, the cover member (100) may inhibit shield an EMI (Electromagnetic Interference). Because of this characteristic in the cover member (100), the cover member (100) may be called an "EMI shield can". The cover member (100) may be connected to a ground part on a PCB (40), whereby the cover member (100) may be grounded. The cover member (100) may inhibit electric waves generated from outside of the lens driving device (10) from entering an inside of the cover member (100). Furthermore, the cover member (100) may inhibit the electric waves generated from inside of the cover member (100) from being emitted to outside of the cover member (100).

The cover member (100) may include an upper plate (101) and a lateral plate (102). The cover member (100) may include an upper plate (101) and a lateral plate (102) extended from an outer periphery of the upper plate (101) to a lower (bottom) side.

For example, the cover member (100) may be coupled to the base (500). A portion of the lateral plate (102) of the cover member (100) may be coupled to the base (500). A lower end of the lateral plate (102) at the cover member (100) may be mounted at a staircase part of the base (500). An inner lateral surface of lateral plate (102) at the cover member (100) may directly contact an outer lateral surface of the base (500). The inner lateral surface of lateral plate (102) at the cover member (100) may be coupled to the base (500) by an adhesive (not shown). In another example, the cover member (100) may be directly coupled to an upper surface of PCB.

An inner space formed by the cover member (100) and the base (500) may be disposed with the mover (200), the stator (300) and the elastic member (600). Through this configuration, the cover member (100) can protect inner elements against an external impact and simultaneously inhibit infiltration of external foreign objects.

The cover member (100) may include an opening (110). The opening (110) may be formed at the upper plate (101) of the cover member (100). The opening (110) may expose the lens module to an upper side. The opening (110) may be formed in a shape corresponding to that of the lens module. The size of opening (110) may be formed to be greater than that of a diameter of the lens module in order to allow the lens module to be assembled through the opening (110). A light introduced through the opening (110) may pass through the lens module. At this time, the light having passed the lens module may be obtained as an image by being converted to an electrical signal by the image sensor.

The mover (200) may be disposed at an inside of the stator (300). The mover (200) may move along an optical axis direction relative to the stator (300). The mover (300) may move integrally with the lens module through an electromagnetic interaction with the stator (300). Focus may be adjusted as the mover (200) moves relative to the stator (300). The mover (200) may include a bobbin (210) and a driving coil (220). The mover (200) may include a bobbin (210) coupled by the lens module. The mover (200) may include a bobbin (210) disposed at an inside of a housing (310). The mover (200) may include a driving coil (220) disposed at the bobbin (210). The mover (200) may include a driving coil (220) that faces a driving magnet (320).

The bobbin (210) may be disposed at an inside of the housing (310). The bobbin (210) may be disposed with the driving coil (220). The bobbin (210) may be coupled by an elastic member (600). An upper surface of bobbin (210) may be coupled by an upper elastic member (610). A lower surface of bobbin (210) may be coupled by a lower elastic member (620). The bobbin (210) may be disposed with a sensing magnet (710). The bobbin (210) may be disposed at one side with a sensing magnet (710) and may be disposed at the other side with a compensating magnet (720). The bobbin (210) may be coupled with the lens module. An inner peripheral surface of bobbin (210) may be coupled by an outer peripheral surface of lens module. The bobbin (210) may move to an optical axis direction relative to the housing (310).

The bobbin (210) may include a through hole (211), a coil coupling part (212) and an upper coupling part (213) and a lower coupling part (214). However, any one or more of the through hole (211), the coil coupling part (212) and the upper coupling part (213) and the lower coupling part (214) may be omitted or changed.

The bobbin (210) may include a through hole (211) that is formed at an inside thereof. The through hole (211) may be coupled to the lens module. An inner peripheral surface of through hole (211) may be formed with a screw thread having a shape corresponding to that formed at an outer peripheral surface of lens module. That is, the through hole (211) may be screw-connected with the lens module. An adhesive may be interposed between the lens module and the bobbin (210). At this time, the adhesive may be an epoxy cured by UV and heat. That is, the lens module and the bobbin (210) may be adhered by UV-curing epoxy and/or a heat-curing epoxy.

The bobbin (210) may include a coil coupling part (212) wound or mounted with a driving coil (220). The coil coupling part (212) may be integrally formed with an outer peripheral surface of bobbin (210). Furthermore, the coil coupling part (212) may be continuously formed along the outer peripheral surface of bobbin (210) or may be formed by being spaced apart from the outer peripheral surface of bobbin (210). For example, the coil coupling part (212) may be formed by allowing a portion of the outer peripheral surface of bobbin (210) to be recessed in a shape corresponding to that of the driving coil (220). At this time, a coil of the driving coil (220) may be directly wound on the coil coupling part (212). In a modification, the coil coupling part (212) may be formed in an upper side-opened or a bottom side-opened shape. At this time, the driving coil (220) may be inserted and coupled to the coil coupling part (212) through the opened portion while the coil is in a pre-wound state.

The bobbin (210) may include an upper coupling part (213) coupled with the upper elastic member (610). The upper coupling part (213) may be coupled to an inner peripheral part (612) of the upper elastic member (610). For example, a lug of the upper coupling part (213) may be coupled by being inserted into a groove or a hole of the inner peripheral part (612) of the upper elastic member (610). At this time, the lug of the upper coupling part (213) may fix the upper elastic member (610) by being fused in a state of being inserted into a hole of the inner peripheral part (612).

The bobbin (210) may include a lower coupling part (214) coupled to the lower elastic member (620). The lower coupling part (214) may be coupled to an inner peripheral part (622) of the lower elastic member (620). For example, a lug of the lower coupling part (214) may be coupled by being inserted into a groove or a hole of the inner peripheral part (622). At this time, the lug of the lower coupling part (214) may fix the lower elastic member (620) by being fused in a state of being inserted into a hole of the inner peripheral part (622).

The bobbin (210) may include a sensing magnet receptor part (215) accommodating the sensing magnet (710). The sensing magnet receptor part (215) may be formed at one side of the bobbin (210). The sensing magnet receptor part (215) may accommodate the sensing magnet (710). The sensing magnet receptor part (215) may be formed by being recessed inwardly from the coil coupling part (212).

The bobbin (210) may include a compensating magnet receptor part (216) accommodated by the compensating magnet (720). The compensating magnet receptor part (216) may be formed at the other side of bobbin (210). The compensating magnet receptor part (216) may accommodate the compensating magnet (720). The compensating magnet receptor part (216) may be formed by being recessed inwardly from the coil coupling part (212). The compensating magnet receptor part (216) may be symmetrically formed from a center of the sensing magnet receptor part (215) and the bobbin (210). In this case, when the magnetic force of the sensing magnet (710) accommodated into the sensing magnet receptor part (215) and the magnetic force of the compensating magnet (720) accommodated into the compensating magnet receptor part (216) are symmetrically formed, there may be an electromagnetic balance between the sensing magnet (710) and the compensating magnet (720). As a result, the influence affected to the electromagnetic interaction by the sensing magnet (710) between the driving coil (220) and the driving magnet (320) may be minimized.

The driving coil (220) may be disposed at the bobbin (210). The driving coil (220) may be disposed to face the driving magnet (320). The driving coil (220) may move the bobbin (210) relative to the housing (310) through an electromagnetic interaction with the driving magnet (320). The driving coil (220) may be overlapped with the sensing magnet (710) to a direction perpendicular to an optical axis. The driving coil (220) may be disposed at an outside of the sensing magnet (710).

The driving coil (220) may include at least one coil. The driving coil (220) may be formed with one coil to be wound on an outer lateral surface of the bobbin (210) by being guided to the coil coupling part (212). Furthermore, in a modification, the driving coil (220) may be disposed with four (4) independent coils, each spaced apart, and the four coils may be disposed at an outer peripheral surface of bobbin (210) to allow forming a 90° between adjacent two coils.

The driving coil (220) may include a pair of lead cables (not shown) in order to supply a power. In this case, the pair of lead cables on the driving coil (220) may be electrically coupled to first and second lower elastic units (624, 625), which are divided elements of the lower elastic member (620). A distal end at one side of the driving coil (220) may be electrically connected to the substrate (740) through the first lower elastic unit (624). A distal end at the other side of the driving coil (220) may be electrically connected to the second lower elastic unit (625) through the substrate (740). Alternatively, the driving coil (220) may receive a power through the upper elastic member (610). Meantime, when a power is supplied to the driving coil (220), an electromagnetic field may be generated about the driving coil (220). In a modification, the bobbin (210) may be disposed with the driving magnet (320) and the housing (310) may be disposed with the driving coil (220). That is, the driving coil (220) and the driving magnet (320) may be disposed by being changed in positions thereof.

The stator (300) may be disposed at an outside of the mover (200). The stator (300) may be supported by the base (500) disposed at a lower side. The stator (300) may be disposed at an inside space of the cover member (100). The stator (300) can move the mover through the electromagnetic interaction. The stator (300) may include a housing (310) disposed at an outside of the bobbin (210). The stator (300) may include a driving magnet (320) that faces the driving coil (220) and that is fixed to the housing (310).

The housing (310) may be disposed at an outside of bobbin (210). The housing (310) may be disposed at an inside with the bobbin (210). The housing (310) may be disposed with the driving magnet (320). The housing (310) may be coupled with the elastic member (610). The housing (310) may be coupled at an upper surface with the upper elastic member (610). The housing (310) may be coupled at a lower surface with the lower elastic member (620). The housing (310) may be formed in a shape corresponding to an inner lateral surface of the cover member (100). The housing (310) may be formed with an insulation material. The housing (310) may be formed in an injection-molded article in consideration of productivity.

The housing (310) may be disposed on the base (500). Alternatively, the housing (310) may be omitted and the driving magnet (320) may be directly fixed onto the cover member (100). An upper surface of housing (310) may be coupled with the upper support member (610), and a lower surface of housing (310) may be coupled with the lower elastic member (620).

The housing (310) may include first to fourth lateral parts (301, 302, 303, 304). The housing (310) may include continuously-disposed first to fourth lateral parts (301, 302, 303, 304). The housing (310) may include a first lateral part (301) adjacent to the fourth and second lateral parts (304, 302). The housing (310) may include a second lateral part (302) adjacent to the first and third lateral parts (301, 303). The housing (310) may include a third lateral part (303) adjacent to the second and fourth lateral parts (302, 304). The housing (310) may include a fourth lateral part (304) adjacent to the third and first lateral parts (303, 301).

The housing (310) may include first to fourth corner parts (305, 306, 307, 308), each mutually spaced apart from the other. The housing (310) may include a first corner part (305) interposed between the first and second lateral parts (301, 302). The housing (310) may include a second corner part (306) interposed between the second and third lateral parts (302, 303). The housing (310) may include a third corner part (307) interposed between the third and fourth lateral parts (303, 304). The housing (310) may include a fourth corner part (308) interposed between the fourth and first lateral parts (304, 301). The housing (310) may include a first corner part (305) interposed between the first lateral surface (301) and a second lateral surface (302) adjacent to the first lateral surface (301), and the sensor part (730) may be disposed at the first corner part (305).

The housing (310) may include a through hole (311), a magnet coupling part (312), an upper coupling part (313), a lower coupling part and a sensor substrate receptor (315). However, any one or more of the through hole (311), the magnet coupling part (312), the upper coupling part (313), the lower coupling part and the sensor substrate receptor (315) may be omitted or changed.

The housing (310) may be opened at an upper side and a lower side to movably accommodate the bobbin (200) to an optical axis direction. The housing (310) may be formed at an inside with a through hole (311). The through hole (311) may be movably disposed with the bobbin (210). That is, the through hole (311) may be formed in a shape corresponding to that of the bobbin (210). Furthermore, an inner circumferential surface of the through hole (311) may be spaced apart from an outer circumferential surface of bobbin (210).

The housing (310) may include, at a lateral surface, a magnet coupling (312) formed in a shape corresponding to that of the driving magnet (320) to accommodate the driving magnet (320). The magnet coupling part (312) may fix the driving magnet (320) by accommodate the driving magnet (320). The magnet coupling part (312) may be formed by passing through a lateral surface of housing (310). Alternatively, the magnet coupling part (312) may be formed at an inner circumferential surface of the housing (310) by being recessed.

The magnet coupling part (312) may include first to fourth coupling holes (331, 332, 333, 334), each being spaced apart from the other. The first coupling hole (331) may be coupled by a first magnet (321). The second coupling hole (332) may be coupled by a second magnet (322). The third coupling hole (333) may be coupled by a third magnet (323). The fourth coupling hole (334) may be coupled by a fourth magnet (324). The first coupling hole (331) may be disposed at a first lateral surface (301) of housing (310). The second coupling hole (332) may be disposed at a second lateral surface (302) of housing (310). The third coupling hole (333) may be disposed at a third lateral surface (303) of housing (310). The fourth coupling hole (334) may be disposed at a fourth lateral surface (304) of housing (310). The first coupling hole (331) may be disposed closer to the fourth corner part (308) than the first corner part (305). The second coupling hole (332) may be disposed closer to the second corner part (306) than the first corner part (305). The third coupling hole (333) may be disposed closer to the second corner part (306) than the third corner part (307). The fourth coupling hole (334) may be disposed closer to the fourth corner part (308) than the third corner part (307). That is, the magnet coupling part (312) may be lopsidedly formed toward second corner part (306) and fourth corner part (308) sides.

The housing (310) may include an upper coupling part (313) coupled to the upper elastic member (610). The upper coupling part (313) may be coupled to an external part (611) of the upper elastic member (610). For example, a lug of the upper coupling part (313) may be coupled to a groove or a hole (not shown) of the external part (611) of the upper elastic member (610) by being inserted into the groove or the hole. At this time, the lug of the upper coupling part (313) may be fused while being inserted into the hole of the external part (611) to fix the upper elastic member (610).

The housing (310) may include a lower coupling part coupled to the lower elastic member (620). The lower coupling part may be coupled to an external part (621) of the lower elastic member (620). For example, a lug of the lower coupling part may be coupled to a groove or a hole of the external part (621). At this time, the lug of the lower coupling part may be fused while being inserted into the hole of the external part (621) to fix the lower elastic member (620). Alternatively, the external part (621) of the lower elastic member (620) may be fixed by a pressing method in which the external part (621) of the lower elastic member (620) is inserted between a lower surface of housing (310) and an upper surface of base (500).

The housing (310) may be formed with a sensor substrate receptor part (315). The sensor substrate receptor part (315) may be formed at the housing (310). The sensor substrate receptor part (315) may accommodate at least one portion of the substrate (740). The sensor substrate receptor part (315) may include a first receptor groove (316) formed by being recessed outwardly from an inner lateral surface of the first corner part (305). The sensor substrate receptor part (315) may include a second receptor groove (317) formed by being recessed inwardly from an outer lateral surface of the first lateral part (301). The sensor substrate receptor part (315) may include a third receptor groove (318) formed by being recessed upwardly from a lower surface of the first lateral part (301).

The first receptor groove (316) may be formed by being recessed outwardly from an inner lateral surface of the first corner part (305) of the housing (310). The second receptor groove (317) may be formed by being recessed inwardly from an outer lateral surface of the first lateral part (301) of the housing (310). The first receptor groove (316) and the second receptor groove (317) may communicate each other. The third receptor groove (318) may be formed by being recessed upwardly from a lower surface of the first lateral part (301) of the housing (310). The first, second and third receptor grooves (317, 317, 318) may be communicated among themselves. The first, second and third receptor grooves (317, 317, 318) may accommodate at least one portion of the substrate (740) and the sensor part (730).

The driving magnet (320) may be disposed at the housing (310). The driving magnet (320) may face the driving coil (220). The driving magnet (320) may be fixed to the magnet coupling part (312) of the housing (310). The driving magnet (320) may be fixed to the housing (310) using an adhesive. The driving magnet (320) may move the driving coil (220) through an electromagnetic interaction with the driving part (220). The driving magnet (320) may not be overlapped with a body part (742) of substrate (740) to a direction perpendicular to an optical axis.

The driving magnet (320) may include at least one magnet. The driving magnet (320) may include first to fourth magnets (321, 322, 323, 324). The driving magnet (320) may include a first magnet (321) disposed at the first lateral part (301), a second magnet (322) disposed at the second lateral part (302), a third magnet (323) disposed at the third lateral part (303), and a fourth magnet (324) disposed at the fourth lateral part (304).

The first to fourth magnets (321, 322, 323, 324) may be mutually spaced apart from each other. The first to fourth magnets (321, 322, 323, 324) may be so disposed at the housing (310) as to allow two adjacent magnets to form a 90° therebetween. The first magnet (321) may be coupled to a first coupling hole (331) of the housing (310). The second magnet (322) may be coupled to a second coupling hole (332) of the housing (310). The third magnet (323) may be coupled to a third coupling hole (333) of the housing (310). The fourth magnet (324) may be coupled to a fourth coupling hole (334) of the housing (310). The first magnet (321) may be symmetrically disposed with the third magnet (323) based on a center of the housing (310). The second magnet (322) may be symmetrically disposed with the fourth magnet (324) based on a center of the housing (310).

The center of first magnet (321) may be disposed closer to the fourth corner part (308) than the first corner part (305) of the housing (310). That is, the center of the first magnet (321) may be lopsidedly formed toward a fourth corner part (308) side. The center of second magnet (322) may be disposed closer to the second corner part (306) than the first corner part (305) of the housing (310). That is, the center of the second magnet (322) may be lopsidedly formed toward a second corner part (306) side. The center of third magnet (323) may be disposed closer to the second corner part (306) than to the third corner part (307) of the housing (310). That is, the center of the third magnet (323) may be lopsidedly formed toward a second corner part (306) side. The center of fourth magnet (324) may be disposed closer to the fourth corner part (308) than the third corner part (307) of the housing (310). That is, the center of the fourth magnet (324) may be lopsidedly formed toward a fourth corner part (308) side. In this case, an electromagnetic interference between the first to fourth magnets (321, 322, 323, 324) and the sensing unit (700) can be minimized. That is, an arrangement space of the sensing unit (700) can be obtained through the shape and arrangement structure of the driving magnet (320) according to the present exemplary embodiment.

The base (500) may be disposed at a lower side of the bobbin (210). The base (500) may be disposed at a lower side of the housing (210). The base (500) may support the stator (300). The base (500) may be disposed at a lower side with a PCB. The base (500) may also function as a sensor holder protecting an image sensor mounted on the PCB.

The base (500) may include a through hole (510), a terminal receptor part (540) and a foreign object collection part (not shown). However, any one or more of the through hole (510), the terminal receptor part (540) and the foreign object collection part may be omitted or changed. The base (500) may include a through hole (510) formed at a position corresponding to a through hole (211) of the bobbin (210). Meantime, the through hole (510) of base (500) may be coupled with an IR (Infrared Ray) filter. However, the IR filter may be coupled to a separate sensor holder disposed at a lower surface of the base (500). The base may include a terminal receptor part (540) accommodated by at least one portion of a terminal part (743) of the substrate (740). The terminal receptor part (540) may accommodate at least one portion of the terminal part (743) of the substrate (740). The terminal receptor part (540) may be formed by being recessed inwardly from an outer lateral surface of the base (500). The terminal part (743) accommodated into the terminal receptor part (540) may be so arranged as to be exposed at a terminal.

The base (500) may include a foreign object collection part collecting foreign object introduced inside of the cover member (100). The foreign object collection part may be disposed at an upper surface of the base (500) and include an adhesive material to collect a foreign object in an inside space formed by the cover member (100) and the base (500).

The elastic member (600) may be coupled to the bobbin (210) and the housing (310). The elastic member (600) may include an elastic member. The elastic member (600) may movably support the bobbin (210) relative to the housing (310). The elastic member (600) may movably support the bobbin (210) relative to the base (500. The elastic member (600) may include an upper elastic member (610) and a lower elastic member (620). However, any one or more of the upper elastic member (610) and the lower elastic member (620) may be omitted or changed. The elastic member (600) may include an upper elastic member (610) coupled to an upper surface of housing and an upper surface of bobbin, and a lower elastic member (620) coupled to a lower surface of housing (310) and a lower surface of bobbin (210). A damper may be disposed at the lower elastic member (620).

The elastic member (600) may include an upper elastic member (610) coupled to an upper surface of bobbin (210) and to an upper surface of housing (310). The upper elastic member (610) may be coupled to an upper surface of bobbin (210) and to an upper surface of housing (310). The upper elastic member (610) may be arranged to an upper side of bobbin (210) and coupled to the bobbin (210) and the housing (310). The upper elastic member (610) may elastically support the bobbin (210) relative to the housing (310). At least one portion of the upper elastic member (610) may have elasticity.

The upper elastic member (610) may include an outer part (611), an inner part (612) and a connection part (613). The upper elastic member (610) may include an outer part (611) coupled to the housing (310), an inner part (612) coupled to the bobbin (210), and a connection part (613) elastically connecting the outer part (611) and the inner part (612). The connection part (613) may elasticity. The upper elastic member (610) may be coupled to an upper surface of bobbin (210) and to an upper surface of housing (310). The inner part (612) of the upper elastic member (610) may be coupled to an upper coupling part (213) of bobbin (210), and the outer part (611) of the upper elastic member (610) may be coupled to an upper coupling part (313) of housing (310).

The elastic member (600) may include a lower elastic member (620) coupled to a lower surface of bobbin (210) and to a lower surface of housing (310). The lower elastic member (620) may be coupled to the bobbin (210) and to the housing (310). The lower elastic member (620) may be arranged to a lower side of bobbin (210) and coupled to the bobbin (210) and the housing (310). The lower elastic member (620) may be coupled to a lower surface of bobbin (210) and to a lower surface of housing (310). The lower elastic member (620) may elastically support the bobbin (210) relative to the housing (310). At least one portion of the lower elastic member (610) may have elasticity.

The lower elastic member (620) may include an outer part (621), an inner part (622) and a connection part (623). The upper elastic member (620) may include an outer part (621) coupled to the housing (310), an inner part (622) coupled to the bobbin (210), and a connection part (623) elastically connecting the outer part (621) and the inner part (622). The connection part (623) may elasticity. The lower elastic member (620) may be coupled to a lower surface of bobbin (210) and to a lower surface of housing (310). The inner part (622) of the lower elastic member (620) may be coupled to a lower coupling part (214) of bobbin (210), and the outer part (621) of the lower elastic member (620) may be coupled to a lower coupling part of housing (310). However, the outer part (621) of the lower elastic member (620) may be fixed by being pressed between a lower surface of housing (310) and an upper surface of base (500).

The lower elastic member (620) may be separated to a pair in order to be used for supply of an electric power to the driving coil (220). The lower elastic member (620) may include a first lower elastic unit (624) electrically connecting a distal end at one side of the driving coil (220) and the substrate (740). The lower elastic member (620) may include a second lower elastic unit (625) spaced apart from the first lower elastic unit (624) to electrically connect a distal end at the other side of the driving coil (220) and the substrate (740). The lower elastic member (620) may be formed with a conductive member.

The connection part (623) of the lower elastic member (620) may include an outer extension part (631) extended outwardly from the outer part (621). The connection part (623) may include an inner extension part (632) extended inwardly from the inner part (622). The connection part (623) may include a connecting extension part (633) connecting the outer extension part (631) and the inner extension part (632). At this time, the connecting extension part (633) may include a first extension part (634) and a second extension part (635) extended by being bent from the first extension part (634).

The outer extension part (631) may be slantly extended for more than three times, as illustrated in FIG. 3. A slantly extended portion of the outer extension part (631) may be extended from the outer part (621) sequentially at an obtuse angle, an acute angle and a right angle, as illustrated in FIG. 3. At this time, the slantly extended portion of the outer extension part (631) may be roundly formed.

The inner extension part (632) can connect the inner part (622) and the connecting extension part (633) in a straight line (-) manner as illustrated in FIG. 3. However, the shape of the inner extension part (632) is not limited thereto.

The connecting extension part (633) may have an 'M' shape as illustrated in FIG. 3. To be more specific, the connecting extension part (633) may include a first extension part (634) slantly extended from the inner extension part (632), a second extension part (635) slantly extended from the first extension part (634), a third extension part (636) slantly extended the second extension part (635) and a fourth extension part (637) slantly extended from the third extension part (636) to be connected to the outer extension part (631). At this time, the first extension part (634) and the second extension part (635) may be roundly extended. As a result, it may be explained that a separate round part is formed between the first extension part (634) and the second extension part (635). Furthermore, it may be also inferably explained that a round part is formed among the second extension part, the third extension part and the fourth extension part.

Meantime, when the connecting extension part (633) is multiply slanted as mentioned before, there is an advantage of obtaining a sufficient length for the connection part (623) even in a limited space between the outer part (621) and the inner part (622). For information, when the length of the connection part (623) is secured, there is an advantage of obtaining the elasticity required by the connection part (623) even if the width of the connection part (623) is designed to be wider. At this time, use of wider width of the connection part (623) has a benefit of minimizing the generation of cut or deformation and of being dull to generation of errors, and therefore, the benefit may serve as a great advantage for the elastic member (600) of camera module for optical device that is manufactured in a very small tiny size.

The inner part (622) of the lower elastic member (620) may include first and second coupling parts (641, 642) each coupled to, and spaced apart from the bobbin (210). The inner part (622) may include a body part (643) connecting the first and second coupling parts (641, 642). The inner part (622) may include a protrusion part (644) extended outwardly from the body part (643), where at least one portion of the protrusion part is disposed at the connecting extension part (633).

The sensing unit (700) may provide position information of lens module for auto focus feedback function by detecting the position information. The sensing unit (700) may include a sensing magnet (710), a compensating magnet (720), a sensor part (730) and a substrate (740). However, any one or more of the sensing magnet (710), the compensating magnet (720), the sensor part (730) and the substrate (740) may be omitted or changed. Meantime, although the present exemplary embodiment has explained that the compensating magnet (720) is one element of sensing unit (700), the compensating magnet (720) may be explained as a separate element of the sensing unit (700). The sensing unit (700) may be disposed at one side of the bobbin (210). The compensating magnet (720) may be disposed at the other side of bobbin (210). The sensor part (730) may be disposed at the housing (310) to detect the sensing magnet (710).

The sensing magnet (710) may be disposed at the bobbin (210). The sensing magnet (710) may be detected by the sensor part (730). The sensing magnet (710) may be so disposed as to face a first corner part (305). The sensing magnet (710) may be disposed on a first imaginary line (L1 of FIG. 9), which is an imaginary straight line connecting the first corner part (305) and a third corner part (307). The sensing magnet (710) may have a magnetism corresponding to that of the compensating magnet (720). The sensing magnet (710) may be disposed at one side of the bobbin (210). The sensing magnet (710) may be overlapped with the driving coil (220) to a direction perpendicular to an optical axis. The sensing magnet (710) may be disposed at an inside of the driving coil (220). The sensing magnet (710) may be arranged in consideration of a relative position of the sensor part (730) by being 4-pole magnetized so as to be used only on a section where a Hall output is of a positive number.

The compensating magnet (720) may have a magnetism corresponding to that of the sensing magnet (710). The compensating magnet (720) may be disposed at the other side of the bobbin (210). The compensating magnet (720) may be disposed on a first imaginary line (L1), which is an imaginary straight line connecting the first corner part (305) and the third corner part (307). The compensating magnet (720) may be symmetrically disposed based on a center between the sensing magnet (710) and the bobbin (210), through which an electromagnetic balance may be realized between the sensing magnet (710) and the compensating magnet (720). As a result, an influence affecting the electromagnetic interaction between the driving coil (220) and the driving magnet (320) may be minimized on the sensing magnet (710).

The sensor part (730) may detect the sensing magnet (710). The sensor part (730) may be disposed on a first imaginary line (L1), which is an imaginary straight line connecting the first corner part (305) and the third corner part (307). That is, all the sensor part (730), the sensing magnet (710) and the compensating magnet (720) may be disposed on the first imaginary line (L1). The sensor part (730) may be mounted on the substrate (740). The sensor part (730) may be mounted on the extension part (741) of substrate (740). The sensor part (730) may include a Hall sensor (Hall IC) detecting a magnetic field of a magnet.

The Hall sensor is fixed to the housing (310), and the sensing magnet (710) is fixed to the bobbin (210). When the sensing magnet (710) moves along with the bobbin (210), the magnetic flux density detected by the Hall element inside the Hall sensor may be changed in response to a relative position of the Hall sensor and the sensing magnet (710). The Hall sensor may detect a position of lens module using an output voltage of Hall sensor that is in proportion to a magnetic flux density value that changes in response to a relative position of the Hall sensor and the sensing magnet (710).

The substrate (740) may be mounted with the sensor part (730). At least one portion of the substrate (740) may be accommodated into a sensor substrate receptor part (315) formed at the housing (310). The substrate (740) may be electrically connected to a distal end of one side at the driving coil (220) by the first lower elastic unit (624). The substrate (740) may be electrically connected to a distal end of the other side at the driving coil (220) by the second lower elastic unit (625). That is, the substrate (740) may provide an electric power to the driving coil (220) through the lower elastic member (620).

The substrate (740) may include a body part (742) accommodated into the second receptor groove (317) of housing (310). The substrate (740) may include a terminal part (743) extended downwardly from the body part (742). The substrate (740) may include an extension part (741) bent from the body part (742) to be accommodated into the first receptor groove (316) of the housing (310), and mounted with a sensor part (730). The substrate (740) may be an FPCB (Flexible Printed Circuit Board). However, the present invention is not limited thereto.

The substrate (740) may be inserted from a lower side to a sensor substrate receptor part (315) of the housing (310). The substrate (740) may be fixed by an adhesive (not shown) while being inserted into the sensor substrate receptor part (315). The body part (742) may be disposed at an outside of the housing (310) and the extension part (741) may be disposed at an inside of the housing (310) while the substrate (740) is in the process of being inserted into the sensor substrate receptor part (315) of the housing (310), through the said structure of which the terminal part (743) disposed at a lower side of the body part (742) may become easy in being electrical conducted with outside elements, and the sensor part (730) mounted on an inner surface of the extension part (741) can detect with a high output the sensing magnet (710) disposed thereinside.

The extension part (741) may be bent from body part (742) to be accommodated into the first receptor groove (316) of the housing (310). The extension part (741) may be mounted with the sensor part (730). The body part (742) may be accommodated into the second receptor groove (317). The body part (742) may not be overlapped with the driving magnet (320) to a direction perpendicular to an optical axis. The terminal part (743) may be downwardly extended from the body part (742). The terminal part (743) may be exposed to outside.

The lens driving device (10) according an exemplary embodiment of the present invention may include a bobbin sub assembly. The bobbin sub assembly may be such that the sensing magnet (710) and the compensating magnet (720) are fixed on two corner areas faced by the assembly of bobbin (210) and driving coil (220). Adhesive reliability by the sensing magnet (710) and the compensating magnet (720) can be obtained with a same size as that of the conventional lens driving device (10) by allowing inserting the sensing magnet (710) and the compensating magnet (720) into a pocket shape through securement of space at a corner between the driving coil (220) and the bobbin (210). The reason of the sensing magnet (710) and the compensating magnet (720) being inserted altogether is to allow an influence by magnetic field interference with the driving magnet (320) to be symmetrical. Thus, when the magnetic field interference is small, an assembly of one sensing magnet (710) alone may suffice.

The lens driving device (10) according an exemplary embodiment of the present invention may include a cover can assembly. The substrate (740) assembly can be fixed by being alternately inserted into a gap between the housing (310) and the cover member (100) in the cover can assembly, through the said structure of which the auto focus feedback function can be realized with a same size as that of the conventional AF lens driving device by arranging the Hall sensor in a corner area according the exemplary embodiment of the present invention.

Meantime, in the exemplary embodiment of the present invention, the driving magnet (320) is made to be lopsidedly arranged to a side where the sensing magnet (710) and the compensating magnet (720) are not disposed, whereby the tilt generated by influence caused by the magnetic field interference between the sensing magnet (710) and the compensating magnet (720) can be minimized.

The lens driving device (10) according an exemplary embodiment of the present invention may include a damper (not shown). The damper may be coated on the connection part (623) of the lower elastic member (620) and the bobbin (210). Alternatively, the damper may be coated on the connection part (623) of lower elastic member (620) and a fixing frame of lower elastic member (620). The damper may be epoxy hardened by UV light. Meantime, a process standardization design may be realized in a manner similar to that of the conventional AF lens driving device by coating the damper from lower side of the lower elastic member (620).

The damper may be coated on the lower elastic member (620). The damper may include damper gel. The damper may be disposed at the connection part (623). The connection part (623) in the exemplary embodiment of the present invention may be called a "mover". Meantime, the outer part (621) and the inner part (622) may be commonly called "fixing frames" in the exemplary embodiments of the present invention. According to the exemplary embodiments, the damper may be coated between the mover of the lower elastic member (620) and the frame to expedite an easy adjustment of damping force design-wise. According to the exemplary embodiments, the damper can be coated on positions between the most of the movers and frames, and damping gel coating positions may be set according to the damping forces that are required design-wise.

The damper may include a first damper (810) integrally coated on the connection part (623) and the inner part (622). The first damper may be coated on any one or more positions of a first position (801) integrally coated on the first extension part (634) and the protrusion part (644) and a second position (802) integrally coated on the second extension part (635) and the protrusion part (644).

The first damper may be coated on any one or more positions of a third position (803) integrally coated on the outer extension part (631) and the body part (643), a fourth position (804) integrally coated on the inner extension part (632) and the body part (643), and a fifth position (805) integrally coated on the connecting extension part (633) and the body part (643).

The damper may include a second damper (not shown) integrally coated on the connection part (623) and the outer part (621). The second damper may be coated on a sixth position (806) integrally coated on the connection part (623) and the outer part (621). The second damper may be respectively coated on a plurality of positions, each mutually spaced apart from the other.

The damper may include a third damper integrally coated on the first extension part (634) and the second extension part (635), as a modification, as illustrated in FIG. 4. The third damper may be coated on a seventh position (807) integrally coated on the first extension part (634) and the second extension part (635).

Now, the operation of camera module according to an exemplary embodiment of the present invention will be described.

To be more specific, the auto focus function of camera module according to an exemplary embodiment of the present invention will be described.

When a power is supplied to the driving coil (220), the driving part (220) may move relative to the driving magnet (220) by the electromagnetic interaction between the driving coil (220) and the driving magnet (320). At this time, the bobbin (210) coupled with the driving coil (220) may integrally move along with the driving coil (220). That is, the bobbin (210) coupled at an inside by the lens module may move to an optical axis direction relative to the housing (310). The bobbin's movement like this may result in the lens module moving nearer to or moving distantly from the image sensor, whereby the focus adjustment can be performed to a subject by supplying a power to the driving coil (220) in the exemplary embodiment.

Meantime, the camera module according to the exemplary embodiment may be applied with an auto focus feedback in order to realize a more accurate performance over the auto focus function. The sensor part (730) disposed at the housing (310) may detect a magnetic field of the sensing magnet (710) fixed to the bobbin (210). Thus, when the bobbin (210) performs a relative movement to the housing (310), an amount of magnetic field detected by the sensor part (730) may be changed because a distance between the sensor part (730) and the sensing magnet (710) is changed.

The sensor part (730) may transmit a detected value to the controller by detecting a movement to an optical axis direction or a position of bobbin (210) using this method. The controller may determine whether to perform an additional movement to the bobbin (210) using the received detected value. This process is generated in real time, and therefore, the auto focus function of the camera module according to the exemplary embodiment can be more accurately performed through the auto focus feedback.

In the foregoing description, the exemplary embodiment has been explained using an AF model capable of performing an auto focus function. However, in a modification from the exemplary embodiment, the housing (310) and the base (500) may be spaced apart, and the lateral elastic member may movably support the housing (310) relative to the base (500), and an OIS coil may be disposed at an upper surface of base (500) to face the driving magnet (320). That is, in the modification of the present exemplary embodiment, the OIS function may be performed along with the auto focus function.

Although the present invention has been explained with all constituent elements forming the exemplary embodiments of the present disclosure operating by being combined or coupled in one element, the present invention is not limited to the given exemplary embodiments. That is, all constituent elements may be operated by being selectively coupled in one or more elements. Furthermore, in light of the fact that the hitherto-described term "includes", "comprises" or "has" as used herein means that relevant elements may be embedded, it should be appreciated that other elements may not be excluded but other elements may be further included, unless otherwise described. All terms including technical and scientific terms used herein have the same meaning as commonly understood by one of ordinary skill in the art to which this invention belongs, unless otherwise defined. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

The above explanations are merely illustrative of technical ideas of the present invention, and it should be understood that numerous other modifications and changes can be devised by those skilled in the art within a scope not deviated from the intrinsic characteristics of this invention. Thus, the exemplary embodiments disclosed in the present invention are not to restrict but to explain the technical ideas of the present invention, and the scope of technical ideas of the present invention is not limited by these exemplary embodiments. The scope of protection of the invention must be interpreted by the following claims, and all technical ideas within the equivalent scope thereof may be interpreted to include the scope of rights of the present invention.

The invention claimed is:

1. A lens driving device comprising:
a housing;
a bobbin disposed in the housing;
a coil disposed on the bobbin;
a magnet disposed on the housing and facing the coil;
an elastic member coupled to the bobbin; and
a damper disposed on the elastic member,
wherein the elastic member comprises an inner part coupled to the bobbin, an outer part disposed outside the inner part, and a connection part connecting the outer part and the inner part, and
wherein the damper is disposed on the connection part,
wherein the connection part comprises a curved part having a curved shape, a first extension part extending from one end of the curved part, and a second extension part extending from the other end of the curved part,
wherein the damper connects the first extension part and the second extension part,
wherein the inner part includes a curved shape,
wherein the damper is spaced apart from the outer part and the inner part, and
wherein each of the first extension part and the second extension part straightly extends from the curved part.

2. The lens driving device of claim 1, wherein the elastic member comprises an upper elastic member disposed on an upper surface of the bobbin, and a lower elastic member disposed on a lower surface of the bobbin, and
wherein the damper is disposed on the lower elastic member.

3. The lens driving device of claim 1, wherein the connection part comprises an outer extension part extending from the outer part, an inner extension part extending from the inner part, and a connecting extension part connecting the outer extension part and the inner extension part, and
wherein the connecting extension part comprises the curved part, the first extension part, and the second extension part.

4. The lens driving device of claim 3,
wherein the inner part comprises first and second coupling parts coupled to the bobbin and spaced apart from each other, a body part connecting the first and second coupling parts, and a protrusion part outwardly extending from the body part and at least a portion of the protrusion part being disposed between the first extension part and the second extension part, and
wherein another damper connects the connecting extension part and the protrusion part.

5. The lens driving device of claim 4, wherein the connecting extension part comprises a third extension part slantedly extending from the second extension part, and a fourth extension part slantedly extending from the third extension part, and
wherein each of the first to fourth extension parts is roundly formed at least on a partial portion thereof.

6. The lens driving device of claim 1, wherein the damper is spaced apart from the bobbin and the housing.

7. The lens driving device of claim 1, wherein at least a portion of the damper is disposed between the first extension part and the second extension part.

8. The lens driving device of claim 3, wherein the first extension part is disposed between the outer extension part and the curved part, and
wherein the second extension part is disposed between the inner extension part and the curved part.

9. The lens driving device of claim 1, comprising:
a sensing magnet disposed at one side of the bobbin; and
a sensor disposed on the housing and facing the sensing magnet,
wherein the sensor is disposed at a corner part of the housing.

10. The lens driving device of claim 9, wherein the magnet is disposed at a lateral part of the housing, and
wherein the magnet is lopsidedly disposed to one side of corner part between both sides of the corner part of the housing.

11. The lens driving device of claim 9, comprising a compensating magnet disposed at an other side of the bobbin and having a shape and a magnetism corresponding to those of the sensing magnet.

12. The lens driving device of claim 9, comprising:
a substrate disposed with the sensor; and
a substrate reception part formed on an outer lateral surface of the housing and accommodating at least a portion of the substrate.

13. The lens driving device of claim 12, wherein the substrate comprises a body part accommodated into the substrate reception part, a terminal part extending downwardly from the body part, and an extension part bent from the body part to be extended inward of the corner part of the housing and mounted with the sensor, and
wherein the body part is not horizontally overlapped with the magnet.

14. The lens driving device of claim 9, wherein the housing comprises a first lateral part and a third lateral part, each formed at an opposite side, a second lateral part and a fourth lateral part formed between the first lateral part and the third lateral part, each formed at an opposite side and first to fourth corner parts interposed between the first to fourth lateral parts, respectively,
wherein the magnet comprises a first magnet unit disposed at the first lateral part, a second magnet unit disposed at the second lateral part, a third magnet unit disposed at the third lateral part, and a fourth magnet unit disposed at the fourth lateral part,
wherein the sensor is disposed at the first corner part, a center of the first magnet unit is disposed to the fourth corner part closer than the first corner part, a center of the second magnet unit is disposed to the second corner part closer than the first corner part, a center of the third magnet unit is disposed to the second corner part closer than the third corner part, and a center of the fourth magnet unit is disposed to the fourth corner part closer than the third corner part.

15. The lens driving device of claim 2, wherein the lower elastic member comprises a first lower elastic unit electrically connected to a distal end of one side of the coil, and a second lower elastic unit spaced apart from the first lower elastic unit and electrically connected to the other distal end of the coil.

16. A camera module, comprising:
a PCB (Printed Circuit Board);
an image sensor disposed on the PCB;
the lens driving device of claim 1 disposed on the PCB; and
a lens coupled to the bobbin of the lens driving device.

17. An optical device, comprising a main body, the camera module of the claim 16 disposed on the main body to photograph an image of a subject, and a display part disposed on the main body to output the image photographed by the camera module.

18. A lens driving device comprising:
a housing;
a bobbin disposed in the housing;
a coil disposed on the bobbin;
a magnet disposed on the housing and facing the coil;
an upper elastic member coupled to the housing and the bobbin; and
a damper disposed on the upper elastic member,
wherein the upper elastic member comprises an outer part coupled to the housing, an inner part coupled to the bobbin, and a connection part connecting the outer part and the inner part,
wherein the damper is disposed on the connection part,
wherein the connection part comprises a curved part having a curved shape, a first extension part extending from one end of the curved part, and a second extension part extending from the other end of the curved part, and
wherein the damper connects the first extension part and the second extension part.

19. A lens driving device comprising:
a cover member comprising an upper plate and a lateral plate extending from the upper plate;
a bobbin disposed in the cover member;
a housing disposed between the cover member and the bobbin;
a base disposed below the housing and coupled to the lateral plate of the cover member;
a coil disposed on the bobbin;
a magnet disposed on the housing and facing the coil;
a lower elastic member comprising an outer part disposed between the housing and the base, an inner part coupled to the bobbin and a connection part connecting the outer part and the inner part; and
a damper disposed on the lower elastic member,
wherein the connection part comprises a curved part having a curved shape, a first extension part extending from one end of the curved part, and a second extension part extending from the other end of the curved part, and
wherein the damper connects the first extension part and the second extension part.

* * * * *